July 19, 1966  K. O. AXELSSON  3,261,662
ABSORPTION OF SULPHUR DIOXIDE AND SEPARATION OF
ASHES FROM COMBUSTION GASES OBTAINED BY
COMBUSTION OF MAGNESIUM WASTE LYE
Filed May 3, 1963

KARL OLLE AXELSSON
INVENTOR.

BY *Albert M. Parker*

ATTORNEY.

United States Patent Office 3,261,662
Patented July 19, 1966

3,261,662
ABSORPTION OF SULPHUR DIOXIDE AND SEPARATION OF ASHES FROM COMBUSTION GASES OBTAINED BY COMBUSTION OF MAGNESIUM WASTE LYE
Karl Olle Axelsson, Viggbyholm, Sweden, assignor to Aktiebolaget Rosenblads Patenter, Stockholm, Sweden, a corporation of Sweden
Filed May 3, 1963, Ser. No. 277,794
4 Claims. (Cl. 23—48)

The present invention relates to absorption of sulphur dioxide and separation of ashes from combustion gases resulting from combustion of magnesium sulphite waste lye from digestion of sulphite pulp on magnesium base.

The most effective method to carry out this process hitherto known is in principle carried out by burning the lye in such a finely divided, suspended condition, that the magnesium-oxide-containing ash resulting therefrom will be precipitated as a dust suspended in the combustion gases, said dust being separated from the combustion gases separately, which thereafter in the form of a current are passed through a scrubber, in which the sulphur dioxide is absorbed in aqueous absorption liquor, which, flushing through the scrubber in contact with the combustion gases subsequently is discharged from the system separately. During the absorption there is maintained in the absorption liquor a pH-value (approxiately 3–5.5) required for said absorption, by introducing magnesium hydrate—derived by slaking the separated ash—by said liquor.

The invention relates to a method for carrying out the above mentioned method, with higher effect and by cheaper means than hitherto and is essentially characterized in that the ash suspended in the combustion gases at least to a substantial portion is caused to accompany the combustion gases to the scrubber.

The invention will now be described more in deatil in comparison with a known method with reference to the accompanying drawing, illustrating some examples diagrammatically and in the form of flow schemes.

Figure 1:
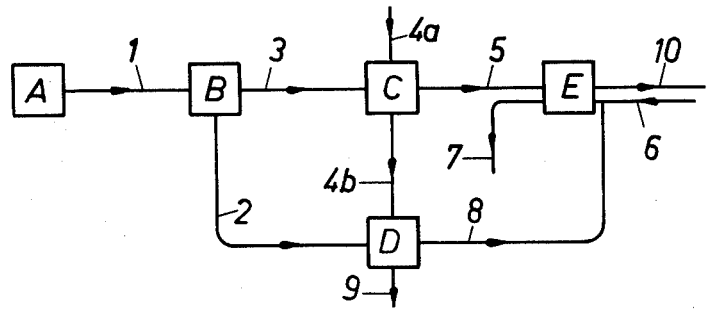
Figure 2:
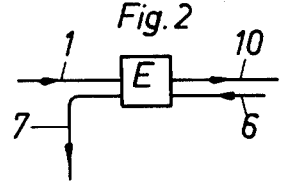
Figure 3:
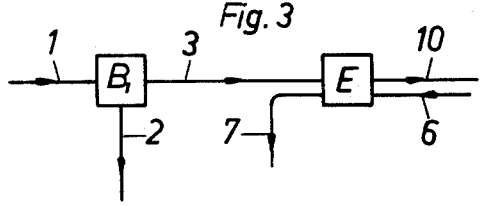

FIG. 1 illustrates the known method and
FIGS. 2 and 3 illustrate each one modification according to the invention. In the different figures identical parts are indicated with the same reference designations.

According to FIG. 1 the burning of the lye is effected in a furnace A, possibly connected to a steam generator not shown in the drawing. Preferably the furnace can be a vortex furnace, for example according to U.S.A. Patent No. 2,678,615 (Canadian Patent No. 504,179). The combustion gases with their contents of ash are passed through a duct 1 to an ash separator B, preferably an electric filter, wherefrom the separated ash through a duct 2 is passed to a slaker D, and the combustion gases liberated from said ash flow through a duct 3 to a cooling and washing tower C in which for further cleaning they are washed with water introduced through a duct 4a whilst the used washing water departs through a duct 4b to the slaker D to be used as slaking liquor for the ash. The combustion gas, finally cleaned from dust, in the washing tower, is conducted therefrom from through a duct 5 to a scrubber or a system of scrubbers E, where the sulphur dioxide is absorbed from the gas by means of an absorption liquor, introduced into the scrubber through a duct 6 and discharged therefrom together with the absorbed sulphur dioxide through a duct 7. The addition of magnesium hydrate required for the pH-regulation in the absorption is effected by introducing sludge of slaked ash from the slaker D through a duct 8 to the absorption liquor. Possible excess of sludge can be discharged from the system through a duct 9. The treated combustion gases leave the system through a duct 10.

As absorption liquor there is generally used magnesium bisulphite solution, which after the absorption of sulphur dioxide can be utilized as crude acid for the digestion process.

As scrubber E a variety of different scrubber types have been applied such as for instance sprinkle towers with or without filling bodies, but during recent years it has been found more suitable to use scrubbers of especially high efficiency where power is used to spread the liquor in the gas-current in the form of an extremely finely divided or atomized spray or shower at high velocity and possibly also in order to impart high velocity to the gas, so as to obtain a mixture as intimate as possible of the gas and the free liquor droplets. As example hereof can be mentioned the so-called venturi scrubber, in which, as known, the gas is forced at high velocity through a venturi tube, into the neck of which the liquor is injected under pressure through atomizer nozzles.

Another example is the so-called curtain-spreader according to the Swedish Patent No. 149,917, according to which the liquor is spread in the gas-current in the form of a curtain-shaped spray, which from the liquor quantity flushing through the scrubber is ejected at high velocity from the periphery of a rotating drum.

In such scrubber systems the sprays are generally formed by the absorption liquor passed through as it is repeatedly circulated within the system so as to be repeatedly atomized in the gas and thereafter collected again, whereby the hydrate required is charged to the circulating absorption liquor in its collected state. It is necessary to circulate large quantities of liquor, so as to prevent the liquor in each moment of reaction when finely divided from becoming too acid for effective absorption of the sulphur dioxide. Since the power consumed for finely dividing the liquor during the circulation is proportional to the quantity of liquor to be atomized and circulated, the requirements for high circulation quantity will thus lead to high power consumption for the atomizing process. In addition, abviously, dimensions and costs for necessary atomization means will increase with the circulating quantity.

However, by tests with absorption systems of the kind to which the invention refers, while utilizing a scrubber of the above mentioned curtain-spreader type, the applicant has made the surprising discovery basic for the invention, that such a scrubber highly effective for the absorption of the sulphur dioxide in addition can serve as an effective slaker and absorber for the ash, as well as cooler for the gas, so that also these steps can be effected in the scrubber. According to the invention this possibility is utilized by allowing ash suspended in the combustion gases to accompany these gases to the scrubber in the combustion gases to accompany these gases to the scrubber in which the ash is absorbed and slaked by the absorption liquor atomized in the spray at the same time as the sulhpur dioxide will be absorbed in this spray. In this manner there is achieved an even distribution of newly formed magnesium hydrate within all parts of the spray or shower so that the pH-adjustment will act continuously as the reaction between the liquor and the sulphur dioxide progresses in the shower, which contributes to a complete and even reaction. Hereby, the quantity of the circulating liquor and thus also the energy consumption of the device and also its dimensions can be reduced.

From these points of view it is obviously most advantageous to allow all the ash required for the pH-regulation to accompany the combustion gases to the scrubber. In the most advantageous case the entire ash quantity can be utilized in this manner, whereby, as apparent from FIG. 2 without further explanation, the entire, earlier necessary separating, washing and slaking system B–C–D can be avoided. If the ash quantity is larger, the excess—as illustrated in FIG. 3—can, by incomplete separation in a separator $B_1$, be discharged from the system through the duct 2. However, this incomplete separation can obviously be carried out with appreciably simpler and cheaper separators than the separators at B and C which are as complete as possible according to FIG. 1. In both of these cases there is thus attained by the invention, in addition to the improvement of the absorption step proper in the scrubber, also the possibility of appreciably simplifying and reducing the cost of the required apparatus for the rest.

The apparatus for each of the partial processes A–E shown in the figures can be of known kind and may comprise one or a plurality of apparatus units, cooperating in a known manner in series and/or connected in parallel with each other.

What I claim is:

1. A method which comprises burning waste magnesium sulphite liquor in finely divided state so as to obtain ashes as finely divided particles suspended in the combustion gases containing sulphur dioxide, passing a stream of such combustion gases and an aqueous absorption liquid through a scrubber in which the sulphur dioxide is absorbed by a spray of the absorption liquid, and retaining in the stream of combustion gases passed to the spray of absorption liquid in the scrubber a quantity of said ashes which in slaked condition will form substantially all the magnesium hydrate required to obtain the desired pH-value in the absorption liquid during the absorption of sulphur dioxide, thereby causing the separation of that quantity of ashes and substantially all slaking and supply of magnesium hydrate to take place in said spray simultaneously with the absorption of sulphur dioxide therein.

2. A method as claimed in claim 1, wherein the quantity of ashes retained in the stream of combustion gases is such as to maintain the pH value of the absorption liquid in the scrubber between about 3 and 5.5.

3. A method as claimed in claim 1, wherein the aqueous absorption liquid is a solution of magnesium bisulphite in water.

4. A method as claimed in claim 1, comprising removing a portion of the ash from the combustion gases before forwarding such gases and the ashes remaining therein to the scrubber.

References Cited by the Examiner
UNITED STATES PATENTS

| | | | |
|---|---|---|---|
| 2,354,175 | 7/1944 | Wilcoxson | 23—48 X |
| 2,542,060 | 2/1951 | Simpson | 23—48 X |
| 2,614,651 | 10/1952 | Wintermute | 23—48 X |
| 2,678,615 | 5/1954 | Soderlund et al. | 23—48 X |
| 2,792,350 | 5/1957 | Bradley et al. | 23—48 X |
| 2,872,289 | 2/1959 | Samuelson | 23—48 X |

OSCAR R. VERTIZ, *Primary Examiner.*

MAURICE A. BRINDISI, BENJAMIN HENKIN,
*Examiners.*

G. OZAKI, *Assistant Examiner.*